United States Patent
Bergsten

(10) Patent No.: US 7,080,207 B2
(45) Date of Patent: Jul. 18, 2006

(54) DATA STORAGE APPARATUS, SYSTEM AND METHOD INCLUDING A CACHE DESCRIPTOR HAVING A FIELD DEFINING DATA IN A CACHE BLOCK

(75) Inventor: James R. Bergsten, Danville, CA (US)

(73) Assignee: LSI Logic Corporation, Milpitas, CA (US)

( * ) Notice: Subject to any disclaimer, the term of this patent is extended or adjusted under 35 U.S.C. 154(b) by 245 days.

(21) Appl. No.: 10/135,209

(22) Filed: Apr. 30, 2002

(65) Prior Publication Data

US 2003/0204677 A1    Oct. 30, 2003

(51) Int. Cl.
*G06F 12/00*      (2006.01)

(52) U.S. Cl. ........................ 711/135; 711/144; 711/208; 711/209

(58) Field of Classification Search ................ 711/118, 711/113, 114, 208, 209, 144, 135
See application file for complete search history.

(56) References Cited

U.S. PATENT DOCUMENTS

| | | | | |
|---|---|---|---|---|
| 3,840,863 A | * | 10/1974 | Fuqua et al. | 711/3 |
| 5,787,242 A | * | 7/1998 | DeKoning et al. | 714/5 |
| 6,029,229 A | * | 2/2000 | Vishlitzky | 711/156 |
| 6,073,209 A | * | 6/2000 | Bergsten | 711/114 |
| 6,108,100 A | * | 8/2000 | McVey et al. | 358/1.16 |

* cited by examiner

*Primary Examiner*—Christian P. Chace
(74) *Attorney, Agent, or Firm*—Suiter West Swantz PC LLO

(57) ABSTRACT

A system, method and apparatus for providing and utilizing a storage cache descriptor by a storage controller are disclosed which provide the ability to effectively balance the size of storage controller cache blocks and the amount of data transferred in anticipation of requests, such as requests by a host. The apparatus may include a storage device, a storage controller and a cache. The storage controller stores electronic data in the cache by including a cache descriptor that defines data contained in a cache block, the cache descriptor including at least one field describing a device block of the cache block. The at least one field may include, by way of example, at least one of a present field, modified field, pinned field and write-in progress field.

19 Claims, 9 Drawing Sheets

DATA STORAGE APPARATUS, SYSTEM AND METHOD INCLUDING A CACHE DESCRIPTOR HAVING A FIELD DEFINING DATA IN A CACHE BLOCK

FIELD OF THE INVENTION

The present invention generally relates to the field of electronic data storage devices, and particularly to a system, method and apparatus for providing and utilizing a storage cache descriptor by a storage controller.

BACKGROUND OF THE INVENTION

The storage of electronic data has become such an important and vital aspect of business and personal life that even brief interruptions to the accessibility of this data may have a profound impact. For example, a business may store records and customer data in electronic format to facilitate the transfer of the data between employees and locations of the business, but in the event of corruption of this data, the very performance of the business itself may halt. Even brief instances of such unavailability may have a great cost when multiplied across the number of users.

To provide for persistent and reliable access to electronic data, a variety of mechanisms and methods have been employed. Once such method is the use of a redundant array of inexpensive disks (RAID). Depending on the RAID protocol used, data may be provided from across the array in a redundant and efficient manner. However, the storage and retrieval of data may be time and resource intensive, the problems with which are only magnified as the number of users and amount of data increases. Therefore, improvements in the efficiency with which such data may be manipulated greatly increase the usability of the system and the resultant desirability of the systems to consumers.

Caches have been provided in conjunction with storage controllers to increase the efficiency of the controller when receiving and sending data to a host, as well as obtaining and writing data to a storage device. However, there is a need to effectively balance the size of storage controller cache blocks and the amount of data transferred in anticipation of requests, such as requests by a host.

Therefore, it would be desirable to provide a system, method and apparatus for providing and utilizing a storage cache descriptor by a storage controller.

SUMMARY OF THE INVENTION

Accordingly, the present invention is directed to a system, method and apparatus for providing and utilizing a storage cache descriptor by a storage controller. The present invention provides the ability to effectively balance the size of storage controller cache blocks and the amount of data transferred in anticipation of requests, such as requests by a host.

In an aspect of the present invention, an electronic data storage apparatus includes a storage device, a storage controller and a cache. The storage controller is communicatively coupled to the storage device, and is suitable for controlling data storage operations of the storage device. The cache is communicatively coupled to the storage controller, the cache suitable for storing electronic data for access by the storage controller. The storage controller stores electronic data in the cache by including a cache descriptor that defines data contained in a cache block, the cache descriptor including at least one field describing a device block of the cache block. The field may include at least one of a present field, a modified field, a printed field, an exclusive lock field, a shared lock field, a device identification (ID) field, a block number field, a storage address field, a hash table queue element field, at least recently used queue element field, and a write-in-progress field. The data storage apparatus may be communicatively linked with a host to provide a data storage system.

In an additional aspect of the present invention, an electronic data storage apparatus includes a means for storing electronic data on a medium, a means for controlling data storage communicatively coupled to the data storing means and a means for cache data communicatively coupled to the controlling means. The caching means is suitable for storing electronic data for access by the controlling means. The controlling means stores electronic data in the caching means by including a cache descriptor that defines data contained in a cache block, the cache descriptor including at least one field describing a device block of the cache block, the at least one field including at least one of a present field, a modified field, a pinned field, an exclusive lock field, a shared lock field, a device ID field, a block number field, a storage address field, a hash table queue element field, a least recently used queue element field, and a write-in-progress field.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an illustration of an exemplary system of the present invention wherein;

DETAILED DESCRIPTION OF THE INVENTION

Reference will now be made in detail to the presently preferred embodiments of the invention, examples of which are illustrated in the accompanying drawings.

Referring generally now to FIGS. 1 through 7, exemplary embodiments of the present invention are shown. Cache have been provided in conjunction with storage controllers to increase the efficiency of the controller when receiving and sending data to a host, as well as obtaining and writing data to a storage device. However, there is a need to effectively balance the size of storage cache blocks and the amount of data transferred in anticipation of requests, such as requests by a host.

Figure 1:
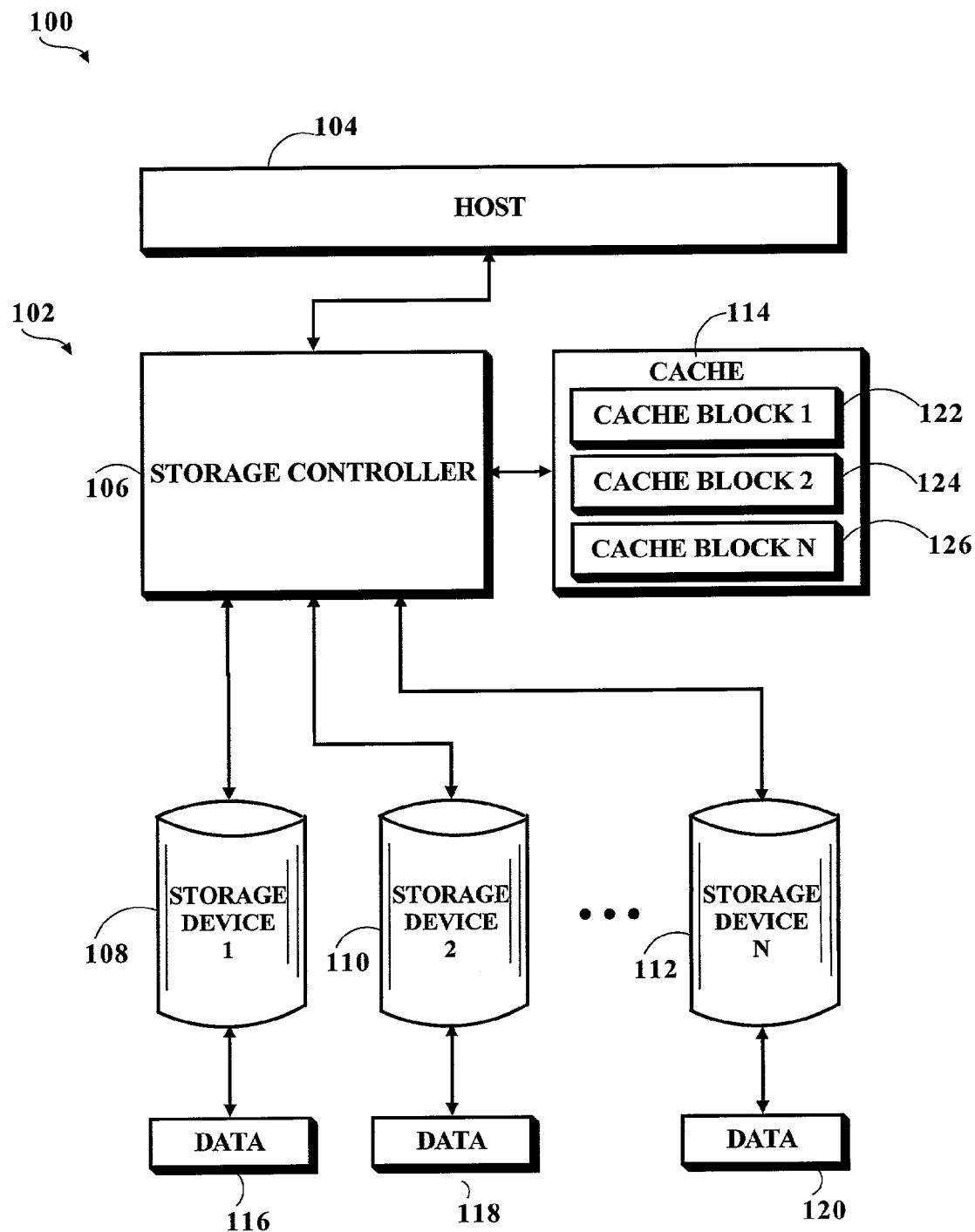

Referring now to FIG. 1, an embodiment of the present invention is shown wherein a system 100 having a host coupled to a storage apparatus includes a cache for optimizing operations. An electronic data storage apparatus 102 may be communicatively coupled to a host 104 to provide data storage operations for the host, such as reading and writing data to and from storage devices. For instance, the data storage apparatus 102 may include a storage controller 106 to control data operations of storage devices 108, 110 & 112. The storage controller 106 may implement a variety of operations, such as to provide redundancy to data by incorporating data storage protocols, such as RAID protocols, persistence of data so that data is accessible even in the event of failure of one of the storage devices 108, 110, & 112, and the like.

To increase efficiency between the host and the reading and writing of data to and from storage devices 108, 110 & 112 by the storage controller 106, a cache 114 may be provided. The cache 114 stages data, obtained from either the host or storage devices, for desired operations. For instance, a storage controller 106 may stage data 116, 118 & 120 obtained from storage devices 108, 110 & 112 as cache blocks 122, 124 & 126 to anticipate data that may be needed by a host 104. Storage controllers previously utilized small cache blocks to optimize cache usage and minimize inadvertent staging of data not needed by a host, or utilized large cache blocks to adequately anticipate host requests. However, smaller cache blocks may not have been sufficient to anticipate the full request by the host, and large blocks resulted in inadvertent copying of data that may not be needed and further required greater system resources. However, the present invention provides a method to achieve a balance between the size of storage controller cache blocks and the amount of data transferred into a cache in anticipation of host requests by providing a cache descriptor data structure that defines data contained in each cache block 122, 124 & 126, and further defines for device blocks within the cache blocks the presence or absence of a condition.

Figure 2:
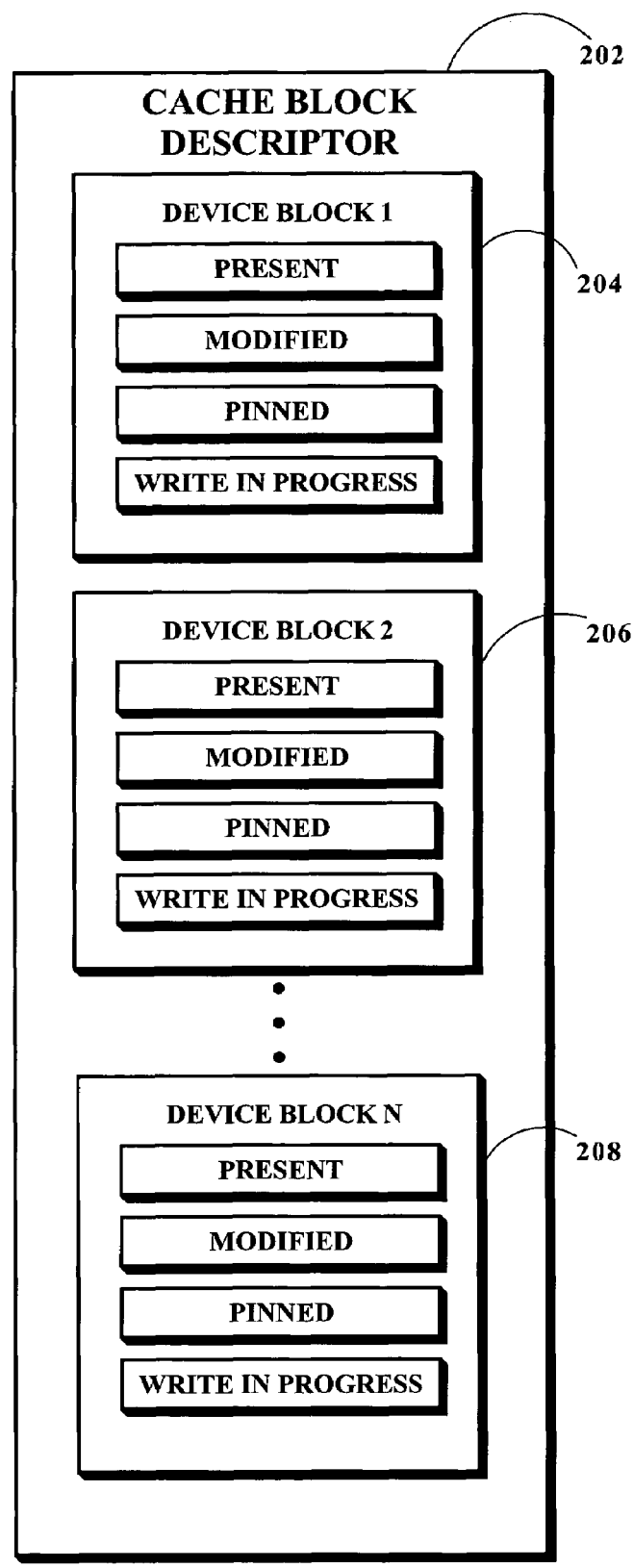
FIG. 2 is an illustration of an embodiment of the present invention wherein a cache block descriptor is shown.

Referring now to FIG. 2, an embodiment of the present invention is shown wherein a cache descriptor including fields defining device blocks within a cache block is shown. A cache descriptor of the present invention may include variety of fields to describe device blocks included within a cache block as contemplated by a person of ordinary skill in the art. Operations may then by performed by a storage controller based on a field indicating a presence or absence of a condition of a corresponding device block as indicated by the field.

A cache block descriptor 202 may include device block fields 204, 206 & 208 for defining corresponding device blocks. By utilizing fields of the present invention, granularity may be achieved down to an individual device block without affecting the size of a cache block. Fields for defining device blocks may describe a variety of conditions, such as "present," "modified," "pinned," and "write-in-progress" which will be described in further detail later in the description. The field may be implemented through one or more binary flags to denote, for each device block within a cache block, the presence or absence of a condition.

Figure 3A:
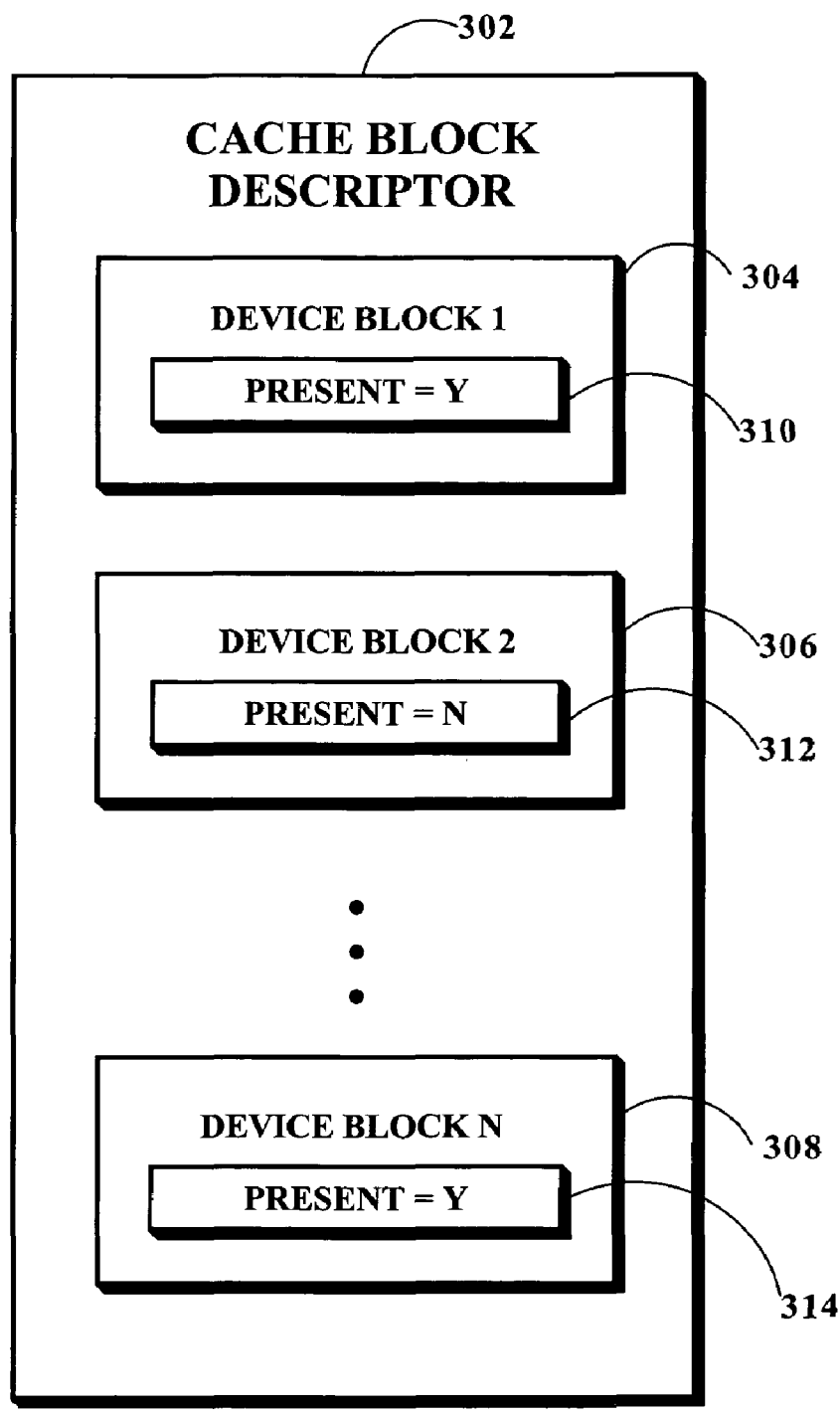
FIG. 3A is an illustration of an embodiment of the present invention wherein a cache block descriptor including a "present" field is shown.

Referring now to FIG. 3A, an embodiment of the present invention is shown wherein a cache block descriptor includes "present" fields to describe presence of device blocks within a cache. A cache descriptor 302 includes device block fields 304, 306 & 308 having a "present" field 310, 312 & 314. The device block fields 304, 306 & 308 correspond to device blocks of a cache block.

The "present" field indicates whether a corresponding device block is present within a cache. Thus, the present fields allow a cache block to be sparse, i.e. not completely filled. In this way, a storage controller may stage data specifically requested by a host, with a minimal waste of caching storage. This also allows individual device blocks to be flushed from memory without flushing an entire cache block.

Figure 3B:
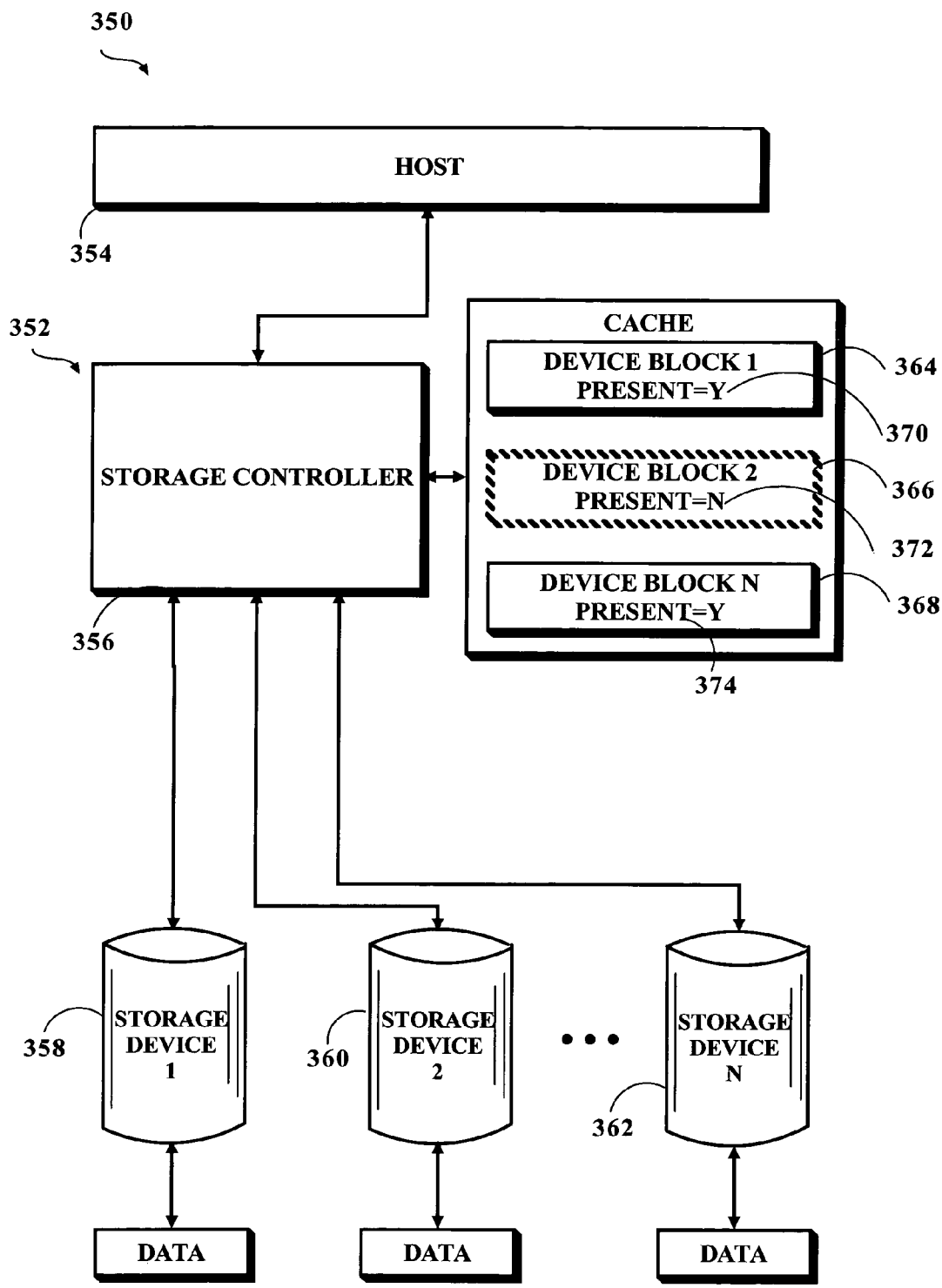
FIG. 3B is an illustration of an embodiment of the present invention wherein a system employing a cache block descriptor including a "present" field is employed.

For example, as shown in FIG. 3B, a system 350 employing the cache descriptor having a "present" field of FIG. 3A is shown. The system 350 may include a data storage apparatus 352 communicatively coupled to a host. A host 354 may request data from the data storage apparatus 352. Therefore, a storage controller 356 may obtain the desired data from storage devices 358, 360 & 362 communicatively coupled to the storage controller 356.

In the request received by the storage controller 356 from the host 354, the host may have specified specific data. When obtaining data from the storage devices 358, 360 & 362, the storage controller 356 may locate the specific data requested, even if that data is less than a cache block amount. For instance, the storage controller may obtain a cache block including a first device block 364, a second device block 366 and an "nth" device block 368. However, the second device block 366 of the cache block may not have been specifically requested by the host. Therefore, the storage controller 356 may read and store the first device block 364 through the "nth" device block 368, but not the second device block 366. To denote such retrieval, the "present " field of the first device block through the "nth" device block may be denoted as present 370 & 374, but the "present" field of the second block is marked as not present 372. In this way, the storage controller may obtain the requested data without unnecessarily filling a cache, thereby conserving resources in both reading and transferring the data, as well cache resources by only storing desired data.

However, instances may be encountered in which an intervening block may be written to improve the overall efficiency of an operation. For instance, in some embodiments, blocks that are already staged may be re-staged, and blocks not modified may be destaged if doing so would shorten input/output (I/O) time. For example, if a single staged or unmodified block exists between two ranges that need to be read or written, one must start two I/O operations, one for the first range, and one for the second. Certain physical storage devices may have long I/O startup times, and thus it may be faster to merge the operations into a single I/O, even if it results in an unnecessary data transfer of the intervening block.

Figure 4A:
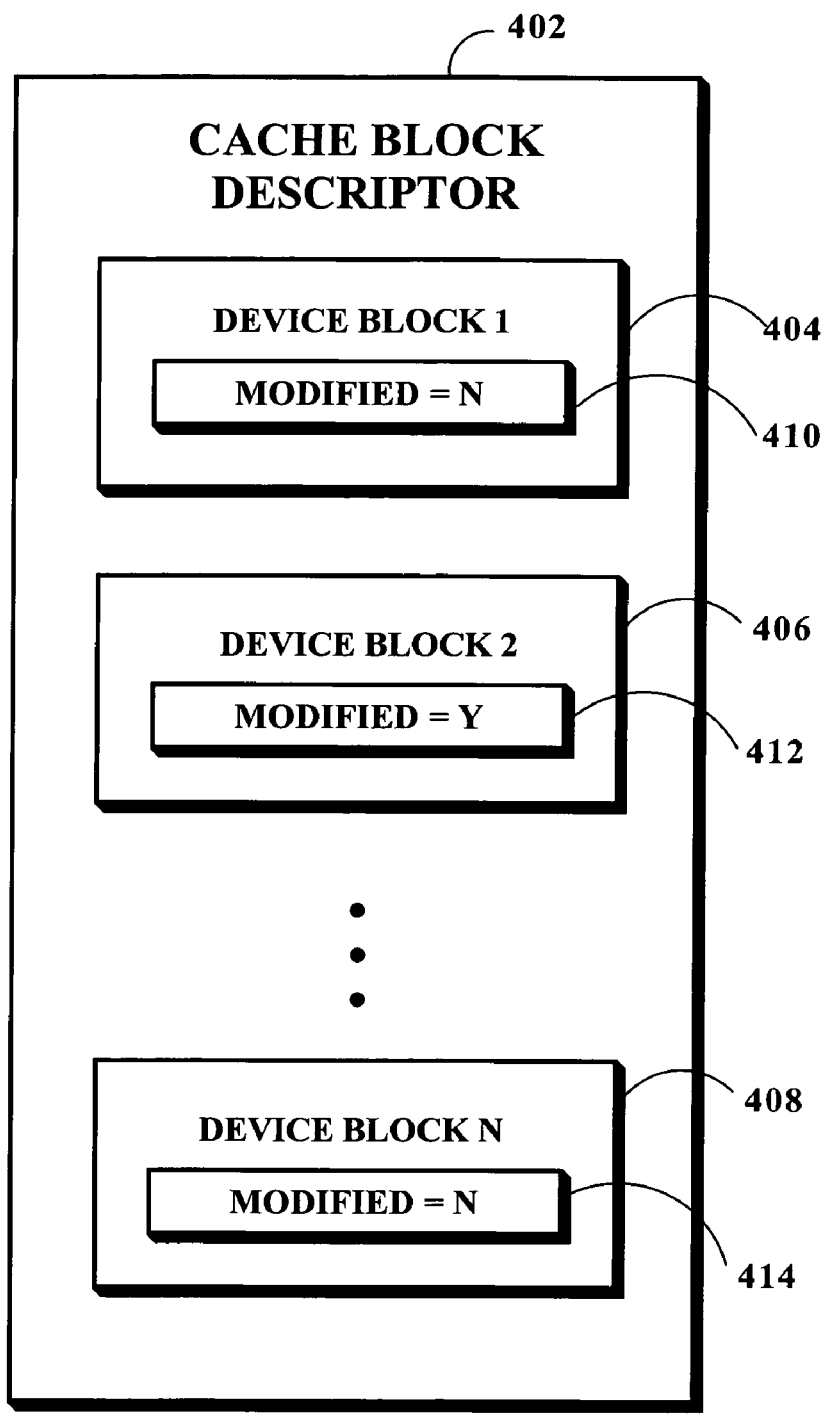
FIG. 4A is an illustration of an embodiment of the present invention wherein a cache block descriptor including a "modified" field is shown.

Referring now to FIG. 4A, an embodiment of the present invention is shown wherein a cache block descriptor includes "modified" fields to describe whether device blocks within a cache have been modified. As before, a cache descriptor 402 may include device block fields 404, 406 & 408 which correspond to device blocks of a cache block. In this instance, the fields include a "modified" field 410, 412 & 414 to indicate whether a device block has been modified.

For instance, a device block may have been modified by data transfer from a host, but the data may not yet have been written to a storage device. By providing such a device block indication, a storage controller may determine what blocks have been modified, and therefore may perform a write including those blocks in an efficient manner by not needing to rewrite unchanged data.

Figure 4B:
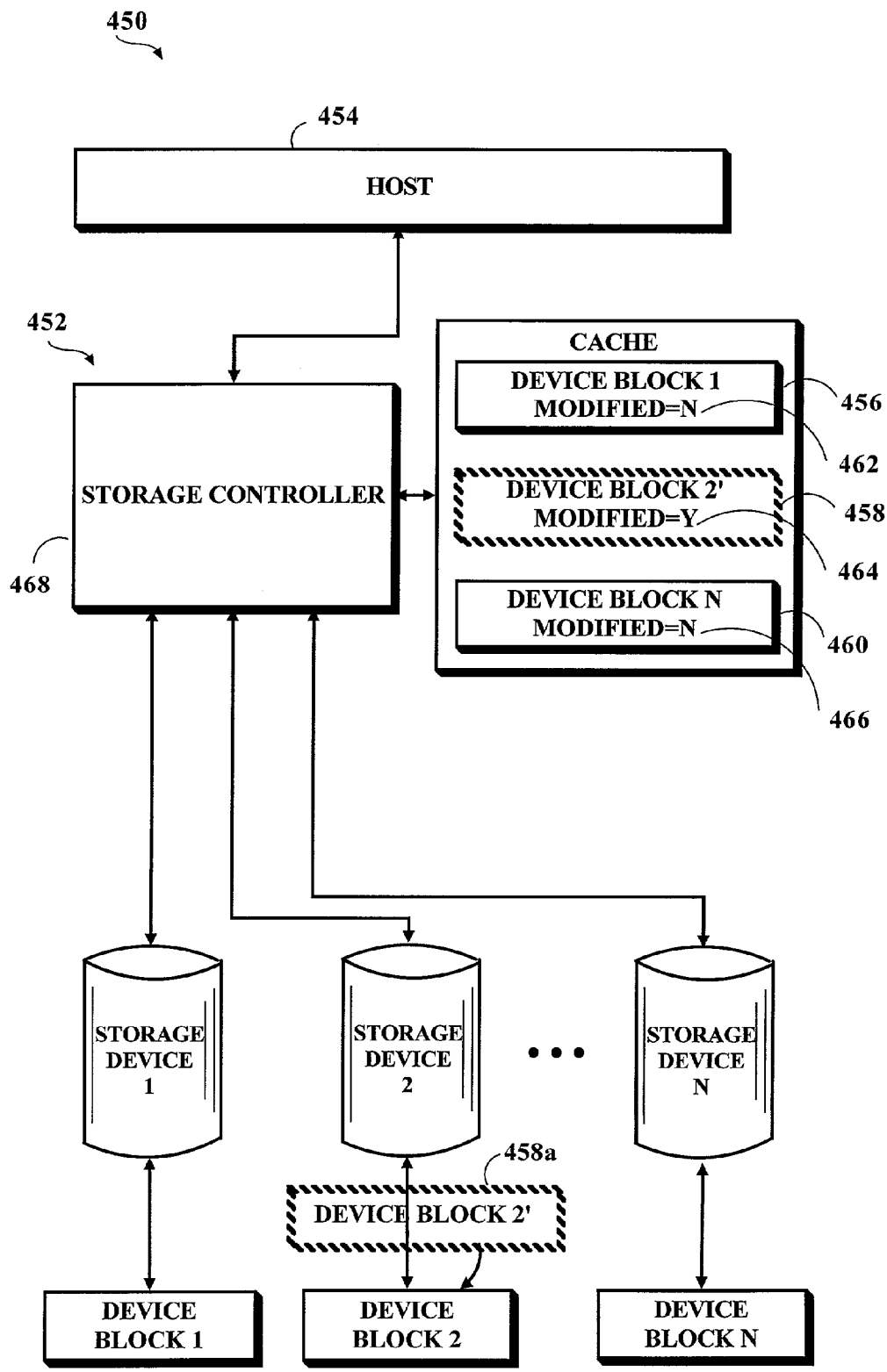
FIG. 4B is an illustration of an embodiment of the present invention wherein a system employing a cache block descriptor including a "modified" field is employed.

For example, as shown in FIG. 4B, a system 450 of the present invention is shown employing a cache descriptor including a "modified" field of FIG. 4A. The system 450 includes a storage apparatus 452 coupled to a host 454 as before. However, in this instance, a device block 458 has been modified by a data transfer from a host 454, while other device blocks 456 & 460 of a cache block have not been modified. Therefore, "modified" fields 462, 464 & 466 of a cache descriptor corresponding to the device blocks may be specified accordingly.

Therefore, a storage controller 468 of the data storage apparatus 452 may readily determine which device blocks have been modified, and then write the block 458a to a storage device without writing blocks 456 & 460 which were not modified. Thus, system resources may be conserved by writing only that data that has been changed, thereby improving the data storage apparatus performance and efficiency. Although not writing blocks that were not modified has been described, it should be apparent to a person of ordinary skill in the art that non-modified blocks may be written in some instances to improve efficiency of the operation. For example, a storage device may have long I/O startup times, thus, it may be faster to write all of the blocks, whether modified or unmodified, to storage devices in the same operation, even if it means unnecessary data transfer of an intervening block.

Figure 5:
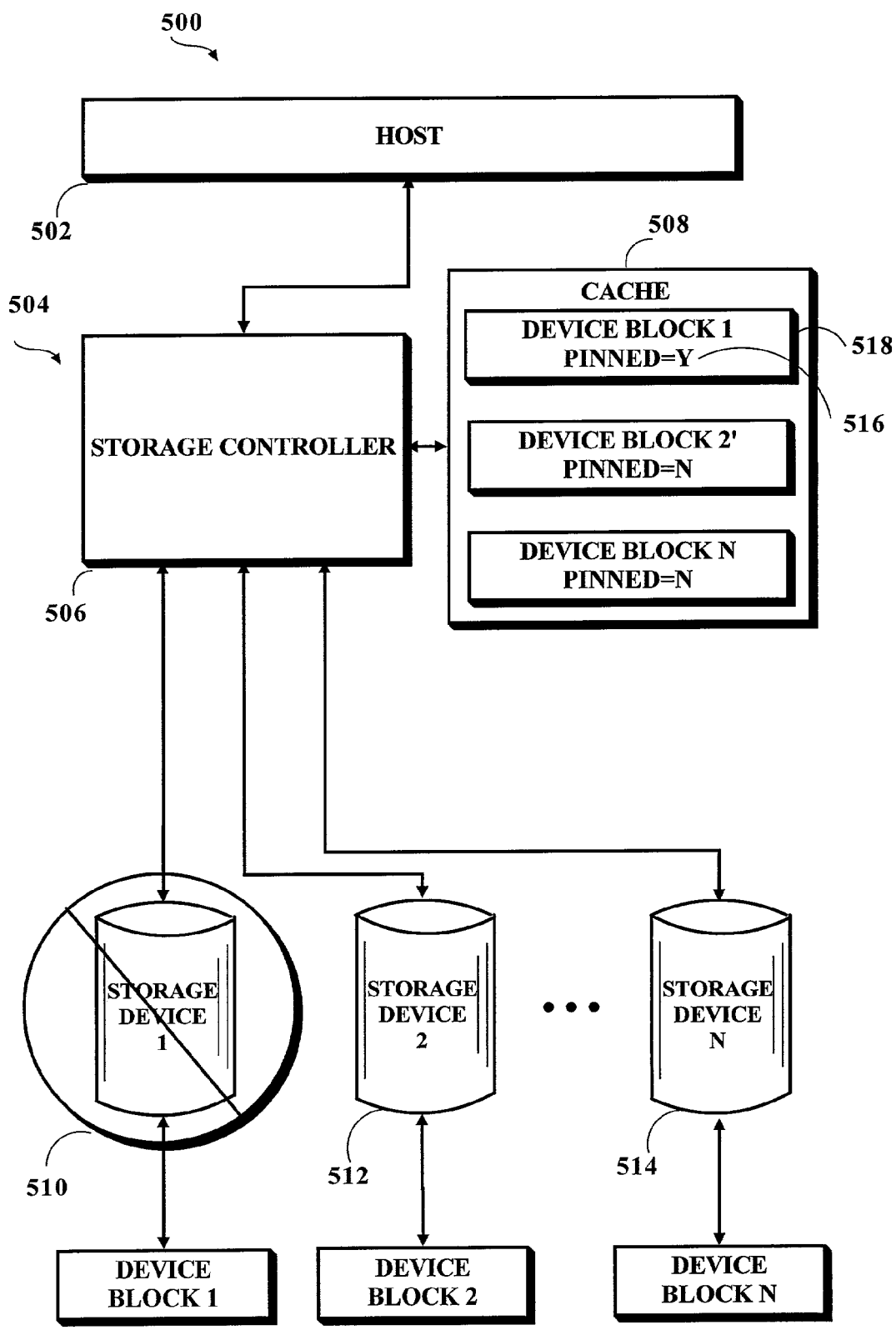
FIG. 5 is an illustration of an example of the present invention wherein a system employing a cache block descriptor including a "pinned" field is embodied.

Referring now to FIG. 5, a system 500 of the present invention is shown wherein a "pinned" field corresponding to a device block of a cache block is utilized by a system to denote device unavailability. A data storage system may encounter instances in which a storage device within the system may become unavailable, such as due to device failure, communication or device path failure, and the like. However, even in instances of such failure, other storage devices may still be operational. Therefore, the present invention provides a "pinned" field to denote the unavailability to device blocks of a cache block, thereby permitting granularity greater than at a cache block level to enable data to be read and/or written to operational devices.

Additionally, the "pinned" field may be utilized to keep data that cannot be written to a storage device because of partial or complete unavailability, such as a device with a defective block or device that has lost power, and the like. The "pinned" field informs the caching system that this data cannot be flushed from the cache, and may inform the system that the corresponding data must be backed up to alternate internal and/or external non-volatile storage. In other embodiments, this field may be used to cause subsequent host I/O to be rejected, or subsequent writes to the same block to be rejected.

For instance, a host may be communicatively coupled to a data storage apparatus 504 to obtain data storage functionality. A storage controller 506 controls operation of the data storage apparatus 504, thereby enabling such functionality as data access, striping, parity data and the like. As described previously, a cache 508 may be included to further optimize operations of the data storage apparatus 504. The cache 508 may include cache blocks which include data blocks that were obtained from storage devices 510, 512 & 514. For instance, a single cache block may include data obtained from multiple storage devices.

In an event of device failure, a "pinned" field for a device block of a cache block is defined to indicate the status of the device. For instance, a "pinned" field 516 corresponding to a first data block 518 was previously stored on a first storage device 510 may indicate unavailability of the storage device. Therefore, by noting the unavailability, the controller may take corrective action, such as to move data to alternate nonvolatile storage devices 512 & 514. Thus, the present invention provides the ability to denote device availability for device blocks and enables corrective action to be taken at a sub-cache block level.

Figure 6:
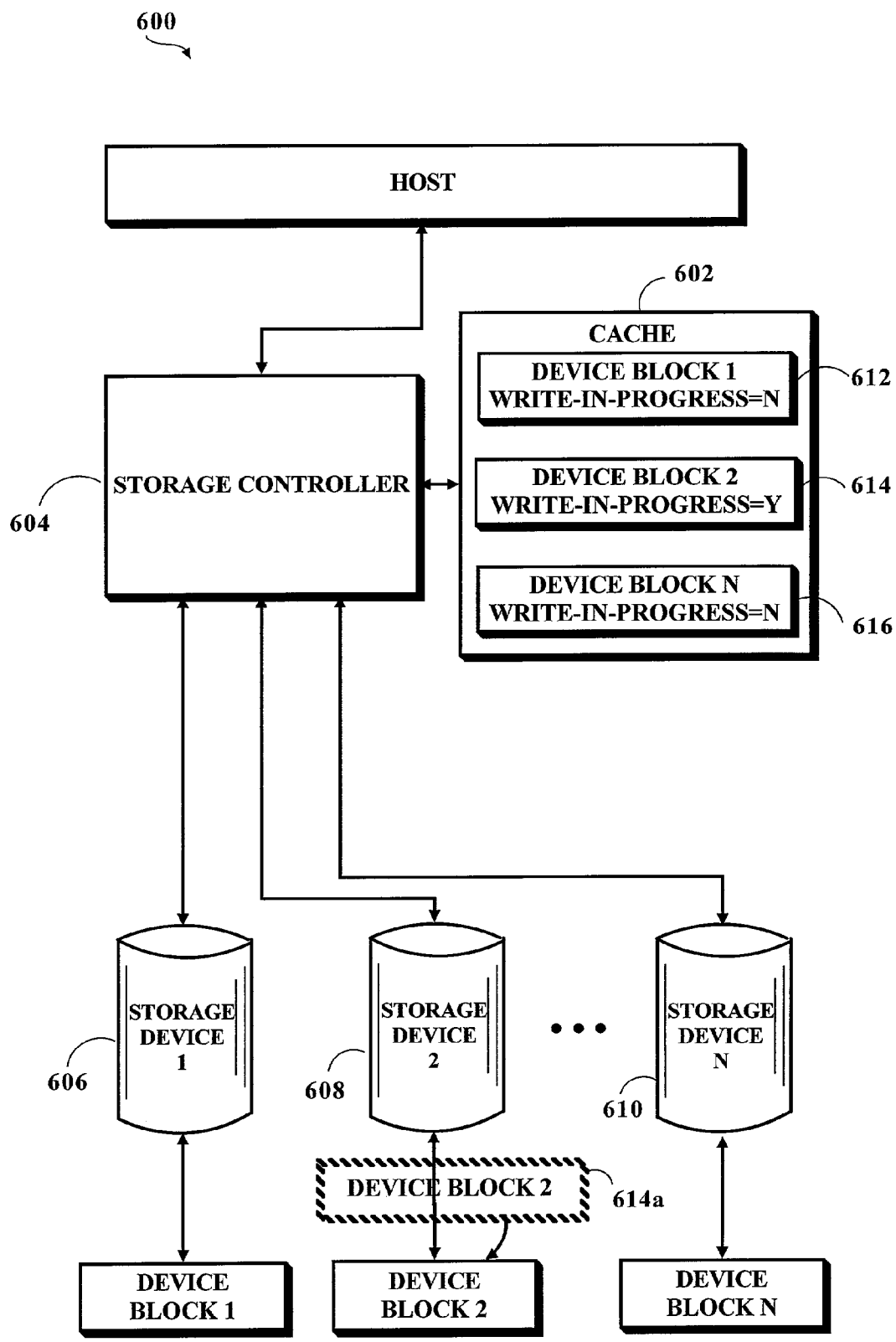
FIG. 6 is an illustration of an embodiment of the present invention wherein a system employing a cache block descriptor including a "write-in-progress" field is implemented.
Figure 7:
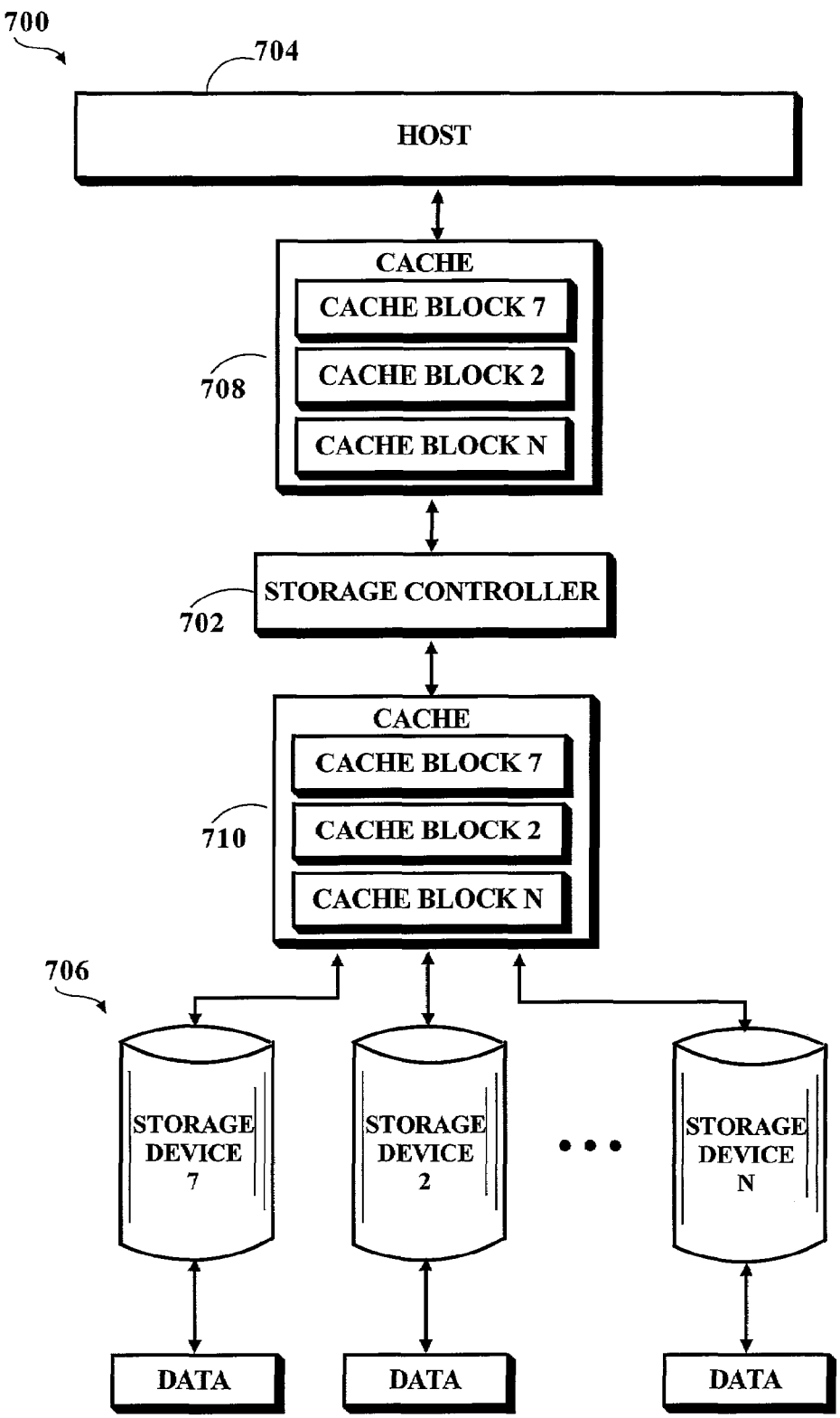
FIG. 7 is an illustration of an embodiment of the present invention wherein other cache placement for communicatively coupling a cache with a storage controller are shown.

Referring now to FIG. 6, a system 600 of the present invention is shown wherein a "write-in-progress" field is utilized to indicate device blocks of cache blocks being destaged to a storage device. A cache 602 may be utilized to hold data before it is written to storage devices 606, 608 & 610 for nonvolatile storage by a storage controller 604, to provide persistent data storage.

While in the process of writing data from the cache 602 to storage devices 606, 608 & 610, the storage controller may set a "write-in-progress" field to indicate the writing of the block. For instance, a cache block may include three device blocks 612, 614 & 616, the second of which 614 is being written 614a to a storage device 608. While the device block 614a is being written, the "write-in-progress" field indicates that the write is being performed. The "write-in-progress" field may be set by the storage controller 604 in a variety of ways, such as by changing the indication before the write is transferred, during initiation of a write, and the like as contemplated by a person of ordinary skill in the art. In this way, a storage controller may be prohibited from destaging data more than once, such as if the host writes the same data multiple times.

Although four fields have been described, it should be apparent that a variety of fields, and various combinations thereof such as two or more fields, for defining device blocks of a cache block are contemplated by the present invention without departing from the spirit and scope thereof, the previous discussion merely being exemplary of some contemplated embodiments. For example, an "exclusive lock" field may be used to indicate that a cache block is being modified, such as by host writes, data staged, and the like, to give one process an exclusive lock on the data. Additionally, a "shared lock" field may be used to indicate that a cache block is being read by a host, or that data is being destaged. Any number of concurrent processes may have a shared lock, but a shared lock cannot be held while an exclusive lock is held. A "device ID" field may also be used to identify the device whose data is being cached in the cache block. A "block number" field may be utilized to indicate the starting block number of the data being cached in the cache block, and a "storage address" field may be utilized to indicate the storage address of cached user data. A "hash table queue element" field may be used to indicate each cached block as a member of a linked list of blocks that are found by a hashing mechanism to minimize block search time, when blocks are accessed the hash queue is reordered to minimize subsequent hash table searches. Additionally, a "least recently used" (LRU) field may be utilized to indicate each cached block as a member of a linked list that is reordered when blocks are accessed. When a new cache block needs to be allocated and there is no free storage to do so, blocks are "stolen" from the bottom of the LRU list, thus, the blocks least recently accessed are used.

The present invention simplifies fault tolerant designs in a number of ways. Storage controller performance is improved because less data is copied among redundant storage controllers. Also, host performance is improved because smaller ranges of data are locked during access, allowing for host I/O operation overlap.

Although a cache has been shown communicatively attached to the storage controller, the cache may be "positioned" in a variety of ways as contemplated by a person of ordinary skill in the art. For example, as shown in the system 700 depicted in FIG. 7, caches are provided in a variety of locations depending on the cache functionality desired. For example, a data storage system may include a storage controller 702 communicatively coupled to a host 704 and storage devices 706. A cache 708 may be positioned between the host 704 and the storage controller 702 to provide caching improvement to an existing storage controller. Likewise, a cache 710 may be positioned between the storage controller 702 and storage devices 706 to improve physical device access.

It is believed that the apparatus and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An electronic data storage apparatus, comprising:
   a storage device suitable for storing electronic data;
   a storage controller communicatively coupled to the storage device, the storage controller suitable for controlling data storage operations of the storage device; and
   a cache communicatively coupled to the storage controller, the cache including a plurality of cache blocks, each cache block of the plurality of cache blocks being suitable for storing electronic data for access by the storage controller;
   wherein the storage controller stores electronic data in the cache by including a cache block descriptor that defines data contained in a cache block included in the plurality of cache blocks, the cache block descriptor including at least one field describing a device block of the cache block;
   wherein the at least one field includes at least one of a present field, a modified field, a pinned field and a write-in-progress field, the present field indicating whether a corresponding device block is present in the cache block;
   wherein the storage controller is configured for staging data specifically requested by a host in a cache block included in the plurality of cache blocks without completely filling the cache block, the storage controller further being configured for flushing the staged data from the cache block without flushing the entire cache block from the cache.

2. The electronic data storage apparatus as described in claim 1, wherein the modified field indicates whether a device block corresponding to the modified field has been modified by a data transfer from a host coupled to the electronic data storage apparatus.

3. The electronic data storage apparatus as described in claim 2, wherein the device block corresponding to the modified field has not been written to the storage device.

4. The electronic data storage apparatus as described in claim 1, wherein the pinned field indicates whether a device block corresponding to the pinned field is suitable for being written to the storage device.

5. The electronic data storage apparatus as described in claim 4, wherein the device block corresponding to the pinned field is indicated as not writable to the storage device because of at least one of device error and device path error.

6. The electronic data storage apparatus as described in claim 1, wherein the write-in-progress field indicates whether a device block corresponding to the write-in-progress field is being destaged to the storage device.

7. The electronic data storage apparatus as described in claim 1, wherein the cache is located at least one of between a host which is coupled to the electronic data storage apparatus and the storage controller and between the storage controller and the storage device.

8. A data storage system, comprising:
   a host; and
   a data storage apparatus communicatively coupled to the host, the data storage apparatus suitable for receiving data from the host for storage and providing data to the host as requested, the data storage apparatus including
   a storage device suitable for storing electronic data;
   a storage controller communicatively coupled to the storage device, the storage controller suitable for controlling data storage operations of the storage device; and
   a cache communicatively coupled to the storage controller, the cache including a plurality of cache blocks, each cache block of the plurality of cache blocks being suitable for storing electronic data for access by the storage controller;
   wherein the storage controller stores electronic data in the cache by including a cache block descriptor that defines data contained in a cache block included in the plurality of cache blocks, the cache block descriptor including at least one field describing a device block of the cache block;
   wherein the at least one field describing the device block of the cache block includes at least one of a present field, a modified field, a pinned field, an exclusive lock field, a shared lock field, a device identification (ID) field, a block number field, a storage address field, a hash table queue element field, a least recently used (LRU) queue element field and a write-in-progress field, the present field indicating whether a corresponding device block is present in the cache block;
   wherein the storage controller is configured for staging data specifically requested by a host in a cache block included in the plurality of cache blocks without completely filling the cache block, the storage controller further being configured for flushing the staged data from the cache block without flushing the entire cache block from the cache.

9. The data storage system as described in claim 8, wherein the modified field indicates whether a device block corresponding to the modified field has been modified by the data transfer from a host.

10. The data storage system as described in claim 9, wherein the device block corresponding to the modified field has not been written to the storage device.

11. The data storage system as described in claim 8, wherein the pinned field indicates whether a device block corresponding to the pinned field is suitable for being written to the storage device.

12. The data storage system as described in claim 11, wherein the device block corresponding to the pinned field is indicated as not writable to the storage device because of at least one of device error and device path error.

13. The data storage system as described in claim 8, wherein the write-in-progress field indicates whether a device block corresponding to the write-in-progress field is being destaged to the storage device.

14. The data storage system as described in claim 8, wherein the cache is located at least one of between the host and the storage controller and between the storage controller and the storage device.

15. An electronic data storage apparatus, comprising:
a data storing means for storing electronic data;
a controlling means for controlling data storage communicatively coupled to the data storing means; and
a caching means for caching data communicatively coupled to the controlling means, the caching means including a plurality of cache blocks, each cache block of the plurality of cache blocks being suitable for storing electronic data for access by the controlling means;
wherein the controlling means stores electronic data in the caching means by including a cache block descriptor that defines data contained in a cache block included in the plurality of cache blocks, the cache block descriptor including at least one further field describing a device block of the cache block, the at least one further field including at least one of a present field, a modified field, a pinned field, an exclusive lock field, a shared lock field, a device ID field, a block number field, a storage address field, a hash table queue element field, a least recently used queue element field, and a write-in-progress field;
wherein the present field indicates whether a corresponding device block is present in the cache block;
wherein the controlling means is configured for staging data specifically requested by a host in a cache block included in the plurality of cache blocks without completely filling the cache block, the controlling means further being configured for flushing the staged data from the cache block without flushing the entire cache block from the caching means.

16. The electronic data storage apparatus as described in claim 15, wherein the modified field indicates whether a device block corresponding to the modified field has been modified by a data transfer from a host coupled to the electronic data storage apparatus.

17. The electronic data storage apparatus as described in claim 15, wherein the pinned field indicates whether a device block corresponding to the pinned field is suitable for being written to a storing means, wherein the device block corresponding to the pinned field is indicated as not writable to a storing means because of at least one of device error and device path error.

18. The electronic data storage apparatus as described in claim 15, wherein the write-in-progress field indicates whether a device block corresponding to the write-in-progress field is being destaged to the storing means.

19. The electronic data storage apparatus as described in claim 15, wherein the caching means is located at least one of between a host which is coupled to the electronic data storage apparatus and the controlling means and between the storage controller and the storing means.

* * * * *